(12) United States Patent
Engstrom

(10) Patent No.: US 8,396,664 B2
(45) Date of Patent: Mar. 12, 2013

(54) 3-D GOLF COURSE NAVIGATION DEVICE AND IMAGE ACQUISITION METHOD

(75) Inventor: Karl Engstrom, San Diego, CA (US)

(73) Assignee: Terra Imaging, La Jolla, CA (US)

( * ) Notice: Subject to any disclaimer, the term of this patent is extended or adjusted under 35 U.S.C. 154(b) by 154 days.

(21) Appl. No.: 12/872,855

(22) Filed: Aug. 31, 2010

(65) Prior Publication Data

US 2011/0191023 A1   Aug. 4, 2011

Related U.S. Application Data

(60) Provisional application No. 61/238,652, filed on Aug. 31, 2009.

(51) Int. Cl.
   *G01C 21/00*    (2006.01)
   *G06K 9/00*    (2006.01)

(52) U.S. Cl. .................... 701/532; 382/154

(58) Field of Classification Search ............. 701/532; 382/154
   See application file for complete search history.

(56) References Cited

U.S. PATENT DOCUMENTS

| | | | | |
|---|---|---|---|---|
| 7,922,606 B2* | 4/2011 | Balardeta et al. | ............. | 473/407 |
| 7,942,762 B2* | 5/2011 | Balardeta et al. | ............. | 473/407 |
| 2008/0189031 A1* | 8/2008 | Meadow et al. | ............. | 701/208 |
| 2008/0312823 A1* | 12/2008 | Huang | ............. | 701/208 |
| 2010/0191462 A1* | 7/2010 | Kobuya et al. | ............. | 701/208 |
| 2010/0312464 A1* | 12/2010 | Fitzgerald et al. | ............. | 701/200 |
| 2010/0332129 A1* | 12/2010 | Balardeta et al. | ............. | 701/208 |
| 2011/0046880 A1* | 2/2011 | Balardeta et al. | ............. | 701/208 |

* cited by examiner

*Primary Examiner* — James Trammel
*Assistant Examiner* — Muhammad Shafi
(74) *Attorney, Agent, or Firm* — San Diego IP Law Group, LLP

(57) ABSTRACT

The present invention provides three-dimensional, topographic data (x,y,z) for a golf course navigation device. In an embodiment of the invention, three data sets are acquired for each golf hole: (1) geospatial digital image data, (2) geospatial terrain data including elevation and topographic measurements, and (3) object data pertaining to trees, bushes, water hazards, buildings, and any other objects present. Each hole is mapped using high resolution airborne photogrammetry and in some cases, light detection and ranging acquisition sensors. Geospatial, three-dimensional terrain data is acquired using a photogrammetry and/or stereo photogrammetry compilation. Object data is acquired from measurements taken from ground level. From all of this acquired data, a three-dimensional (x,y,z) geospatial model is built and then integrated into 3-D gaming, visualization and web mapping environments such as Microsoft Bing Maps, Google Earth, and various mobile and golf cart mounted, golf course navigation systems.

10 Claims, 5 Drawing Sheets

3-D GOLF COURSE NAVIGATION DEVICE AND IMAGE ACQUISITION METHOD

CROSS-REFERENCE TO RELATED APPLICATION

The present application claims priority under 35 U.S.C. §119(e) to U.S. Provisional Patent Application No. 61/238,652, entitled "3-D Golf GPS Navigation Device and System," and filed Aug. 31, 2009, the disclosure of which is incorporated by reference herein in its entirety.

BACKGROUND OF THE INVENTION

1. Field of Invention

This invention relates to golf and more specifically, to three-dimensional (3-D) mapping, photogrammetry, and light detection and ranging (LIDAR) techniques used to produce the software and data required for implementation into a series of golf course navigation software and physical hardware devices that use satellite navigation and geospatial database systems for assisting golf players, fans, and viewers in course navigation, visualization, management, and administration.

2. Description of Related Art

Golf is a game of accuracy, precision and distance. Without an expert caddie along, there's a lot of analysis and sometimes guesswork involved in determining shot distance to the hole, and various course targets such as greens or landing areas with water hazards in play. A golfer's club selection directly depends on the perceived distance of the desired shot.

Global Navigation Satellite Systems (GNSS) is a standard generic term for satellite navigation systems that provide autonomous geo-spatial positioning with global coverage. GNSS allows small electronic receivers to determine their location (longitude, latitude, and altitude) to within several meters using time signals transmitted along a line-of-sight by radio from satellites. Receivers calculate the precise time as well as position, which can be used as a reference for distance measurements. Within the United States, the NAVSTAR global positioning system (GPS) is the only fully operational GNSS. GPS is currently the world's most utilized satellite navigation system. GPS technology has made its way into devices designed to be used as a navigation aid by a player on a golf course. The primary goal of a golf course navigation system is to provide players with distances to all kind of features on the course and especially to the green they are targeting. Beyond basic distance-to-the-hole data, many standard, golf GPS devices tell you the length of your last shot; distance to, and location of targets and hazards; and distance to the front, middle, and back of the green.

Conventional golf GPS devices suffer from a number of drawbacks. First, the geospatial data used (satellite imagery and differential GPS collection systems) in the production in commercially available golf GPS devices, such as those produced by GPS Industries, Sky Golf's Sky Caddie, and Callaway's uPro is very low resolution and is no better than five (5) to thirty (30) yards or meters. This degree of error is critical as a player's full shot distance typically varies by 10 yards or more for each golf club. For example, a player may hit an 8-iron 150 yards and a 7-iron 160 yards. If the golf GPS device indicates that the remaining distance to a pin is 150 yards when it is really 160 yards, then a player hitting an 8-iron instead of a 7-iron will come up well short—an unnecessary error that may result in the player's ball coming to rest in a hazard rather than on the green. This type of inherent error is not well suited for a game considered by many to be a game of inches.

The accuracy of conventional GPS devices is further complicated as some courses are better fit to use the capabilities of GPS than others. For example, in order to obtain a location reading, the GPS receiver must have a non-obstructed view of the sky. Accordingly, courses with lots of trees and other types of natural obstructions are less suitable for golf GPS devices. Objects such a mountains or buildings between the satellite and the receiver can produce significant error, sometimes up to 30 meters.

The graphics displayed on conventional GPS devices are rudimentary at best. Some devices are very basic as they merely display distance data without illustrating respective hole layout, e.g., a superimposed graphic displaying the overall geometry of the fairway, green, and related hazards. Other devices may show a hole's layout, but only through an artist's rendering in two-dimensions using computer generated imagery (CGI). These CGI renderings are then referenced geospatially with latitude and longitude values. For example, the artist will attribute the CGI created bunker with a lat/long value. When this data is loaded to a device with a GPS receiver, the GPS receiver will try to record a true location relating it to the pre-rendered imagery. Recently, airborne imagery of an "oblique" hole layout has been implemented in a golf GPS device provided by Callaway. However, this oblique imagery and perspective view was acquired by Pictometry's Oblique camera system and is not considered a mapping or calibrated camera system usable for mapping or civil engineering. Moreover, all of the images used in these systems are acquired using non-stereo specifications and are considered only two-dimensional in nature, i.e., the hole layout is only displayed as a flat two-dimensional image. No stereo compiled topographic or 3-D terrain data (x,y,z) are provided with respect to changes in topographic elevation, height, and related information such as slope. For a game that depends on where and the way a golf ball lands and bounces, conventional golf GPS systems are woefully inadequate. For example, any device that does not calculate the change in hypotenuse or change in elevation (topography) between point A and point B, is programmatically assuming that a golf course is flat and that a constant horizontal grid of X and Y values are sufficient. In fact, this is not the case as golf courses are not flat and a "true" golf course navigation device must calculate for the change in hypotenuse or change in elevation, topography or slope with respect to a calculated distance between point A and point B.

SUMMARY OF THE INVENTION

The present invention overcomes these and other deficiencies of the prior art by providing three-dimensional, topographic data (x,y,z) for a golf course navigation device and system. In an embodiment of the invention, three data sets are acquired for each golf hole: (1) geospatial digital image data, (2) geospatial terrain data including elevation and topographic measurements, and (3) geospatial, object data pertaining to trees, bushes, water hazards, buildings, and any other objects present (all collectively referred to herein as "3-D golf course data"). For example, each hole is mapped using high resolution airborne photogrammetry and in some cases, LIDAR acquisition sensors. Geospatial, 3-D terrain data is acquired using high resolution photogrammetry and stereo photogrammetry compilation acquired from airplanes, helicopters or other mobile hardware platforms, including backpacks or vehicles. The production of this data involves estimating the three-dimensional coordinates of points on an object within an image as referenced by geodetic parameters such as latitude, longitude, and elevation. These are determined by stereoscopic measurements made in two or more digital photographic images taken from overlapping and adjacent different positions. Common, photogrammetric tie points are identified on each image. A line of sight (or ray) can be constructed from the camera location to the point on the object. It is the intersection of these rays (i.e., triangulation) that determines the three-dimensional location of the point. Sophisticated algorithms are used to produce other information about the scene that is known a priori, for example, symmetries, in some cases allowing reconstruction of 3-D coordinates from only one camera position. Object data is acquired from measurements taken from ground level. From all of this acquired data, a 3-D geospatial model is built (georeferenced with X, Y, Z values of each feature) and then integrated into 3-D gaming and web mapping environments such as Microsoft Bing Maps, Google Earth, EA Sports, full swing golf simulators, and various mobile and golf cart mounted, golf course navigation systems.

In areas that are heavily covered with tree canopy or bushes, LIDAR is used to penetrate these visible features to produce, highly accurate terrain models. LIDAR is an optical remote sensing technology that measures properties of scattered light to find range and/or other information of a distant target. The prevalent method to determine distance to an object or surface is to use light pulses. Like radar technology, which uses radio waves, the distance to an object is determined by measuring the time delay between transmission of a pulse and detection of the reflected signal.

In an embodiment of the invention, a method for producing geospatial, three-dimensional mapping data of a land area comprises the steps of: acquiring aerial imagery of a surface of the land area to produce image data; acquiring terrain data associated with the surface of the land area; acquiring object data associated with one or more objects located on the surface of the land area, and geo-processing the image data, terrain data, and object data to produce geospatial, three-dimensional mapping data of the surface of the land area. The step of acquiring aerial imagery may comprise the step of generating stereo imagery of the surface of the land area. The method may further comprise the step of establishing a global navigation satellite system (GNSS) real time kinematic (RTK) ground control of the land area. The land area can comprise a golf course hole. The steps of acquiring terrain data and object data may comprise the step of performing light detection and ranging sensing. The terrain data comprises altitude information.

In another embodiment of the invention, a method for producing a geospatial, three-dimensional image of a hole on a golf course comprises the steps of: acquiring image data of a hole on a golf course, wherein the image data comprises one or more images of the hole; acquiring terrain data associated with the hole, wherein the terrain data comprises relative altitude information; acquiring object data associated with one or more objects located on the hole; and geo-processing the image data, terrain data, and object data to produce a geospatial, three-dimensional image of the hole.

In yet another embodiment of the invention, a land area navigation device comprises: a global navigation satellite system receiver; memory for storing geospatial, three-dimensional mapping data associated with the land area, wherein the three-dimensional mapping data comprises image data, terrain data, and object data; processing circuitry for generating an image associated with the three-dimensional mapping data with a location indicator superimposed on the image, wherein the location indicator indicates the relative location of the device; and a display. The geospatial, three-dimensional mapping data can be downloaded from a server. The land area may comprise a golf course hole. The image may comprise a distance measurement between the location of the device and a location of a feature of the golf course hole.

In another embodiment of the invention, a remote computer server coupled to a network comprises: memory for storing geo spatial, three-dimensional mapping data associated with a golf course hole, wherein the three-dimensional mapping data comprises image data, terrain data, and object data; a processor for generating an image associated with the three-dimensional mapping data; and a transmitter for transmitting the image to a remote device.

An advantage of the invention is that it provides better accuracy (both visually and distance related) through measuring and calculating the change in the hypotenuse or change in topographic elevation between certain points. A general assumption is that golf courses are not flat, therefore, the horizontal mapping accuracy of a golf course navigation devices are directly dependent upon the measurement and calculation of the hypotenuse to determine the correct and highly accurate horizontal, latitude and longitudinal position of a relative point or distance to enable a player to make better informed decisions on the course, which should lead to faster play. This means that a player or user has the correct ranging, distancing, and course management information, which results in a higher accuracy and precision of shots, and an increased pace of play and performance.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the features and advantages thereof, reference is now made to the ensuing descriptions taken in connection with the accompanying drawings briefly described as follows.

DETAILED DESCRIPTION OF EMBODIMENTS

Figure 1:
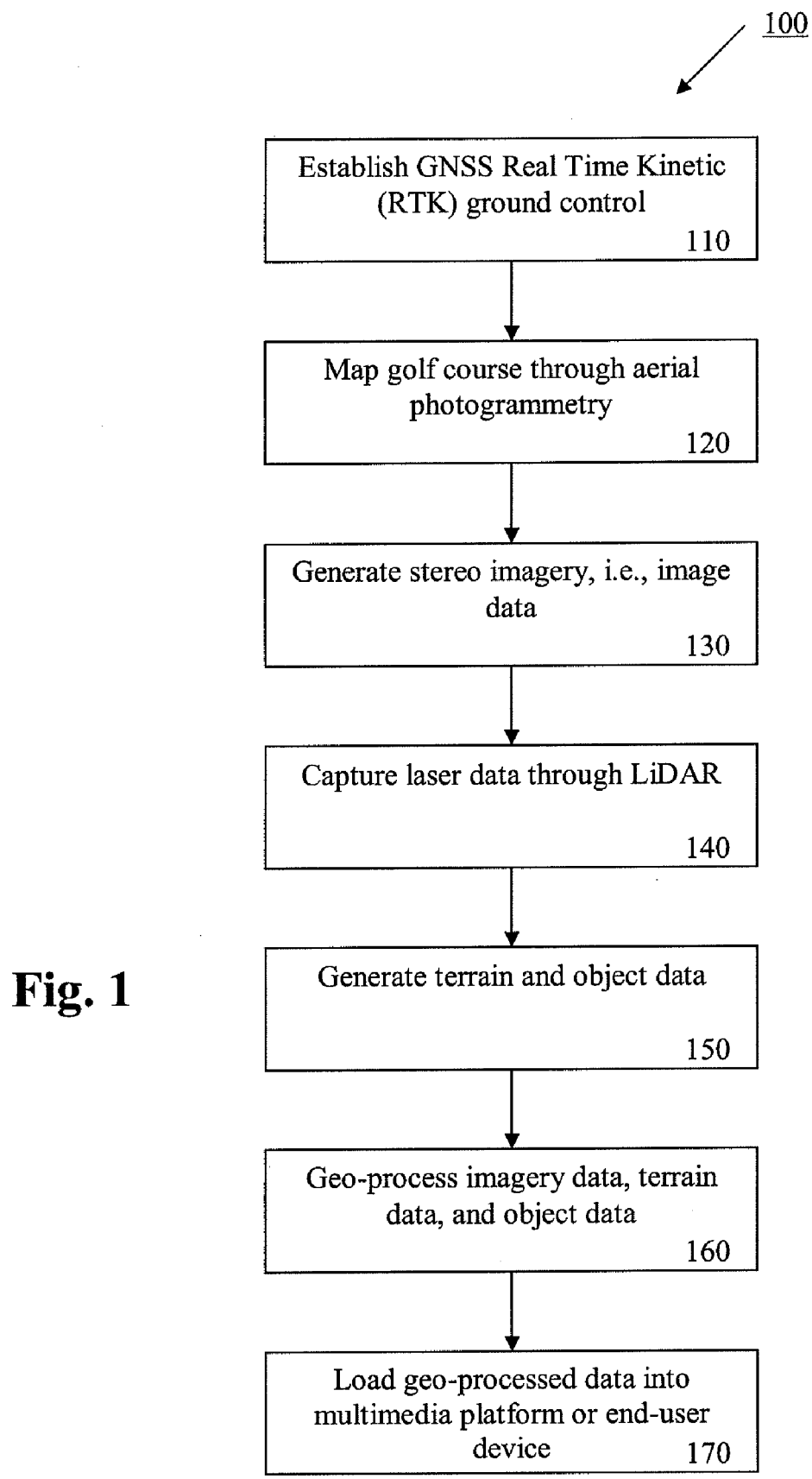
FIG. 1 illustrates a process for acquiring 3-D golf course data according to an embodiment of the invention.

Further features and advantages of the invention, as well as the structure and operation of various embodiments of the invention, are described in detail below with reference to the accompanying FIGS. 1-5, wherein like reference numerals refer to like elements. Although the present invention is described in the context of a golf course, the navigation and display technology described herein may be implemented in other geospatial applications such as, but not limited to, parks, hiking trails, ski resorts, amusement parks, and race courses.

The present invention provides a golf course navigation device that implements three-dimensional data and software for accurate distance measurements. In an embodiment of the invention, three data sets are acquired for each golf hole: (1) image data, (2) geospatial terrain data including elevation measurements, and (3) object data pertaining to trees, bushes, water hazards, buildings, and any other objects present (collectively referred to herein as "3-D golf course data"). For example, each hole is mapped using high resolution airborne photogrammetry and light detection and ranging (LIDAR) acquisition sensors. Geospatial terrain data is acquired and produced from both stereo photogrammetry and LIDAR. Object data is acquired from measurements taken from ground and/or airborne levels. From all of this acquired data, a 3-D geospatial model is built and then displayed on the applicable end-user device.

The geospatial, 3-D golf course data can be located in two different locations depending on the technical requirements of the golf course, user, or geographic location of the golf course. In one embodiment of the invention, the geospatial, 3-D golf course data is stored on a local hard drive or storage means in the device itself. Of course, the device may have network connectivity to update the locally stored 3-D golf course data. In another embodiment of the invention, the 3-D golf course data is stored remotely from the device at, for example, a remote web server, cloud server, or as part of a geospatial mapping platform such as Google Earth or Microsoft Bing Maps (previously known as Microsoft Virtual Earth).

FIG. 1 illustrates a process 100 for acquiring geospatial, 3-D golf course data according to an embodiment of the invention. A GNSS and Real Time Kinematic (RTK) geodetic, ground control of the golf course is established (step 110). RTK, the general implementation of which is apparent to one of ordinary skill in the art, is a process where GNSS signal corrections are transmitted in real time from a reference receiver at a known location to one or more remote rover receivers. The use of an RTK capable GNSS system can compensate for atmospheric delay, orbital errors and other variables found in traditional GPS geometry and calculations, thereby increasing positioning accuracy up to within a centimeter. In an embodiment of the invention, an additional physical and static (i.e., fixed) GNSS base station is provided on the course such as at a clubhouse or a centralized maintenance building. This static base station essentially, supplies a foundation and error correction algorithm to the roving golf course navigation devices by acting as a static, geodetic anchor point on the course.

The golf course is mapped (step 120) from the air with a plane to generate (step 130) stereo (e.g., 80% to 60% overlap) imagery, i.e., image data. This stereo imagery is used to create a large, geo-referenced imagery map of the golf course. Moreover, the georeferenced, stereo imagery (i.e., photogrammetry) is used in the generation of 3-D terrain and 3-D object data (trees, bushes, buildings, features, etc.). As used herein, terrain data refers to the vertical dimensions of a land surface. Laser data is then captured (step 140) from the air and/or ground with a high resolution LiDAR sensor to generate (step 150) the terrain and object data. All of this data is then geo-processed (step 160) to predetermined mapping and geodetic standards, similar and abiding to the based mapping specifications as outlined by the American Society for Photogrammetry and Remote Sensing (ASPRS). The geo-processed data is then loaded (step 170) into various multimedia platforms, including Google Earth, Microsoft Bing Maps and onto the end-user device for use. The end result is a very accurate, geo-referenced 3-D imagery, terrain and object model specific to the golf course and surrounding environment, real estate, etc.

Figure 2:
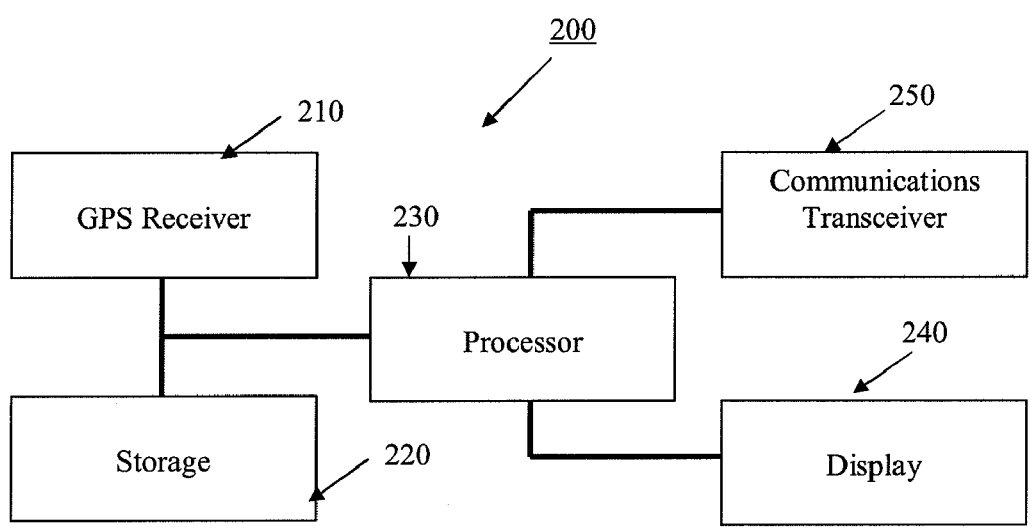
FIG. 2 illustrates a geospatial 3-D golf course navigation device according to an embodiment of the invention.

FIG. 2 illustrates a geospatial data embodied, 3-D golf course navigation device 200 according to an embodiment of the invention. The 3-D golf course navigation device 200 comprises a GPS or GNSS receiver 210, data storage 220, processing circuitry 230, a display 240, and an optional communications transceiver 250. The GNSS receiver 210 receives positioning satellite signals and the RTK base station signal to determine the precise location of the device 200. The data storage 220 stores the 3-D golf course data and may take the form of a hard drive, flash memory, a removable card, or any conventional storage means, the identification and implementation of which is apparent to one of ordinary skill in the art. The processing circuitry 230 comprises a processor or the like, the identification and implementation of which is apparent to one of ordinary skill in the art. The processing circuitry 230 processes the 3-D golf course data and determined location of the device via a GNSS receiver 210 for display. The display 240 is preferably a high-resolution color display such as an light emitting diode (LED) display, although any type of display may be implemented, the identification and implementation of which is also apparent to one of ordinary skill in the art. The optional communications transceiver 250 may be implemented to provide bilateral communications to a remote server, such as Google Earth or Microsoft Bing Maps, for the downloading of 3-D golf course data as well as general communications to remote communication systems.

Figure 3:
FIG. 3 illustrates an Apple iPhone installed with geospatial, 3-D golf course data and software according to an embodiment of the invention.
Figure 4:
FIG. 4 illustrates a dedicated geospatial, 3-D golf course device according to an embodiment of the invention.

The present invention may take several form factors. In one embodiment of the invention, the end-user device is a mobile, hand-held device—either as a dedicated and self-contained device or as software that can be downloaded and installed on a general purpose computing device with GNSS and other capabilities such as, but not limited to the Apple iPhone, iPad, or iPod Touch; a Google Android-enabled device; a Nokia NAVTEQ device; and a Microsoft Windows Mobile OS device. FIG. 3 illustrates an Apple iPhone installed with 3-D golf course data and software according to an embodiment of the invention. The 3-D golf course data and software has been downloaded to the device. The display shows a 3-D image of particular golf hole with pertinent yardage information. Because the iPhone further includes an accelerometer, the degree of ground slope can be determined and displayed when the device is placed on the ground at a particular location. FIG. 4 illustrates a dedicated, geospatial 3-D golf course device according to an embodiment of the invention.

Figure 5:
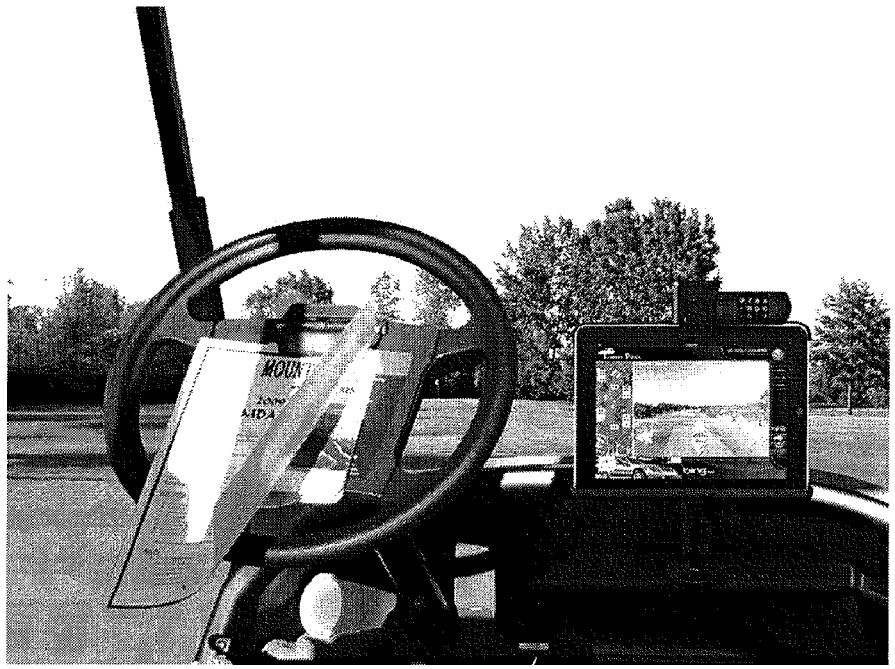
FIG. 5 illustrates the display of a unit mounted in a golf cart implementing an Apple iPad or kiosk according to an embodiment of the invention.
Figure 5:
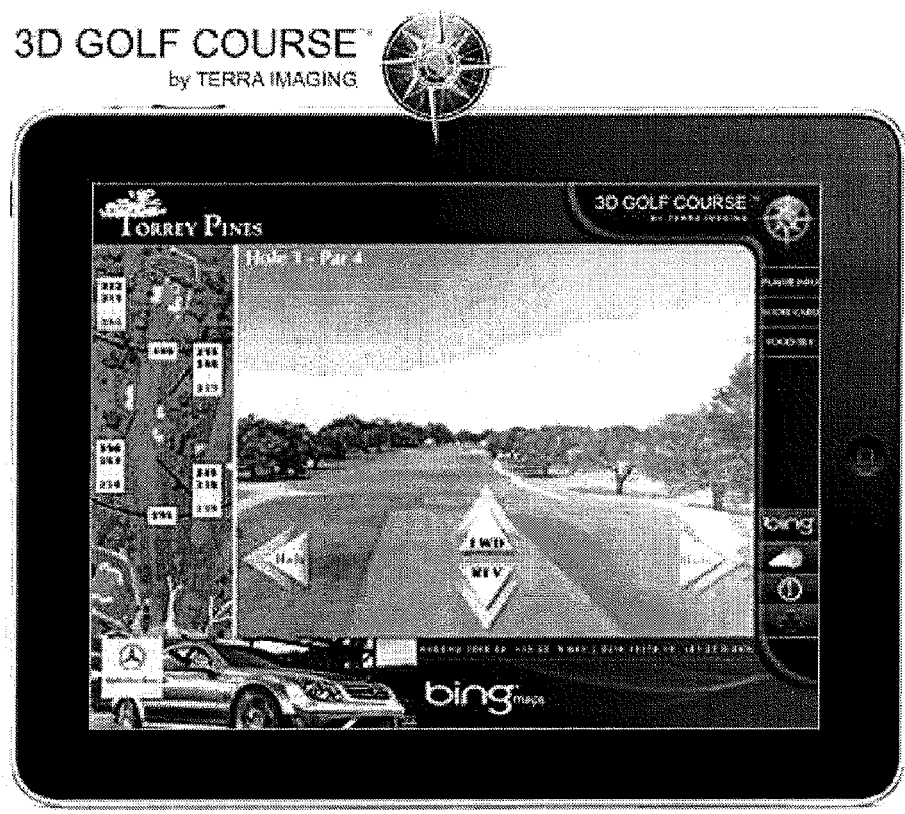

In another embodiment of the invention, the end-user device is implemented as a display unit mounted in a golf cart, implementing the Apple iPad as the primary hardware device for storing and presenting the, geospatial, 3-D golf course data to the end user to be used on a golf cart or in the home. In yet another embodiment of the invention, the end-user device is a kiosk. FIG. 5 illustrates the display of a unit mounted in a golf cart or kiosk according to an embodiment of the invention.

Golf cart displays and kiosks offer other opportunities for the course management. For example, these devices can be equipped with two-way radio-communication, which allow the clubhouse to be in permanent contact with every group of players and to know everything that is happening on the course. For example, course management can track the location of each and every golf course navigation devices being used on the course. Golfers can order food and beverages, while still playing, and the management can send useful information like weather-forecasts and even advertisements to the players.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A method for producing geospatial, three-dimensional mapping data of a land area, the method implemented on a processor and comprising the steps of:
   acquiring, via the processor, aerial imagery of a surface of the land area to produce image data, wherein the step of acquiring aerial imagery comprises the step of generating stereo imagery of the surface of the land area;
   acquiring, via the processor, terrain data associated with the surface of the land area;
   acquiring, via the processor, object data associated with one or more objects located on the surface of the land area,
   geo-processing, via the processor, the image data, terrain data, and object data to produce geospatial, three-dimensional mapping data of the surface of the land area; and establishing a ground control of the land area, wherein the land area comprises a golf course hole.

2. The method of claim 1, wherein the step of establishing a ground control of the land area comprises establishing a global navigation satellite system (GNSS) and a real time kinematic (RTK) ground control of the land area.

3. The method of claim 1, further comprising the step of performing light detection and ranging sensing.

4. The method of claim 1, wherein the terrain data comprises terrain or topographic altitude information.

5. A method for producing a geospatial, three-dimensional image of a hole on a golf course, the method implemented on a processor and comprising the steps of:
   acquiring, via the processor, image data of a hole on a golf course, wherein the image data comprises one or more images of the hole;
   acquiring, via the processor, terrain data associated with the hole, wherein the terrain data comprises relative altitude information;
   acquiring, via the processor, object data associated with one or more objects located on the hole;
   geo-processing, via the processor, the image data, terrain data, and object data to produce a geospatial, three-dimensional image of the hole; and establishing a ground control of the hole.

6. A land area navigation device comprising:
   a global navigation satellite system receiver;
   memory for storing geospatial, three-dimensional mapping data associated with the land area, wherein the three-dimensional mapping data comprises image data, terrain data, and object data;
   processing circuitry for generating an image associated with the three-dimensional mapping data with a location indicator superimposed on the image, wherein the location indicator indicates the relative location of the device; and a display.

7. The apparatus of claim 6, wherein the geospatial, three-dimensional mapping data is downloaded from a server.

8. The apparatus of claim 6, wherein the land area is a golf course hole.

9. The apparatus of claim 8, wherein the image comprises a distance measurement between the location of the device and a location of a feature of the golf course hole.

10. A computer server coupled to a network, the computer server comprising:
    memory for storing geospatial, three-dimensional mapping data associated with a golf course hole, wherein the three-dimensional mapping data comprises image data, terrain data, and object data;
    a processor for generating an image associated with the three-dimensional mapping data; and a transmitter for transmitting the image to a remote device.

* * * * *